US005681621A

United States Patent [19]

Allin et al.

[11] Patent Number: 5,681,621

[45] Date of Patent: Oct. 28, 1997

[54] AQUEOUS MEDIAN TREATING COMPOSITION

[75] Inventors: Gaylord Allin, W. Monroe; Mark Gorham, Shreveport, both of La.

[73] Assignee: Dallas Enviro-Tek International, Inc., Dallas, Tex.

[21] Appl. No.: 455,044

[22] Filed: May 31, 1995

[51] Int. Cl.[6] .................. B25D 1/00

[52] U.S. Cl. .................. 427/391; 427/393.4

[58] Field of Search .................. 524/275, 276, 524/277, 478, 479, 480, 487, 488, 489; 427/391, 393.4

[56] References Cited

U.S. PATENT DOCUMENTS

| | | | |
|---|---|---|---|
| 2,548,802 | 4/1951 | Linscott | 523/335 |
| 3,033,708 | 5/1962 | McKee | 427/375 |
| 3,085,026 | 4/1963 | Weisgerber | 428/182 |
| 3,308,006 | 3/1967 | Kresse et al. | 428/186 |
| 3,523,058 | 8/1970 | Shick | 161/133 |
| 3,791,856 | 2/1974 | Duling | 427/359 |
| 3,997,674 | 12/1976 | Ukai et al. | 524/277 |
| 4,117,199 | 9/1978 | Gotoh et al. | 428/486 |
| 4,129,542 | 12/1978 | Matheson et al. | 524/70 |
| 4,289,671 | 9/1981 | Hernandez | 524/275 |
| 4,315,830 | 2/1982 | French et al. | 252/182 |
| 4,556,603 | 12/1985 | Thorsrud | 428/283 |
| 4,569,968 | 2/1986 | Uffnier et al. | 525/54.5 |
| 4,576,987 | 3/1986 | Crockatt et al. | 524/487 |
| 4,681,910 | 7/1987 | Crockatt et al. | 524/487 |
| 4,942,193 | 7/1990 | Van Buskirk et al. | 524/275 |
| 5,081,174 | 1/1992 | Van Buskirk | 524/275 |
| 5,126,390 | 6/1992 | Duff | 524/275 |
| 5,229,450 | 7/1993 | Van Buskirk et al. | 524/487 |
| 5,232,987 | 8/1993 | Sakakibara et al. | 525/98 |
| 5,258,087 | 11/1993 | Symons | 156/210 |
| 5,308,896 | 5/1994 | Hansen et al. | 524/13 |
| 5,336,712 | 8/1994 | Austgen, Jr. et al. | 524/530 |
| 5,362,573 | 11/1994 | Pandian et al. | 428/511 |
| 5,447,977 | 9/1995 | Hansen et al. | 524/13 |

FOREIGN PATENT DOCUMENTS

| | | | |
|---|---|---|---|
| 0129879 | 11/1978 | Japan | 524/277 |
| 1134588 | 1/1985 | U.S.S.R. | 524/276 |

*Primary Examiner*—Peter A. Szekely
*Attorney, Agent, or Firm*—Baker & Botts, L.L.P.

[57] ABSTRACT

An aqueous treating coating composition suitable for coating a middle corrugated layer of a double-faced liner board, the composition comprising: (A) an emulsion of wax particles, and (B) a binder that is (1) an alkali metal alginate, or (2) a solvent soluble styrene/acrylic copolymer, or (3) a mixture of the styrene/acrylic copolymer with a water-soluble melamine/formaldehyde prepolymer.

4 Claims, No Drawings

AQUEOUS MEDIAN TREATING COMPOSITION

The present invention relates to an aqueous coating composition comprising (A) an emulsion of wax particles and (B) a binder such as an alkali metal alginate. The composition is useful for treating a middle corrugated layer of a double-faced liner board.

BACKGROUND OF THE INVENTION

It is desirable to provide an aqueous composition that can be applied to a substrate such as a liner board to obtain a water-resistant coating that can be used in recyclable products.

It is an object of the present invention to provide an aqueous treating coating composition suitable for coating a middle corrugated layer of a double-faced liner board, the composition comprising (A) an emulsion of wax particles, and (B) a binder that is (1) an alkali metal alginate, or (2) a solvent soluble styrene/acrylic copolymer, or (3) a mixture of the styrene/acrylic copolymer with a water-soluble melamine/formaldehyde prepolymer.

It is an object of the present invention to provide a method of coating a surface of medium corrugated layer of a liner board to provide a water resistant coating, the method comprising the step of applying a thickness of about 0.1 to 10 mils of an aqueous coating composition to the corrugated layer, the composition comprising: (A) an emulsion of wax particles that is about 40 to 98% by weight of the composition, and (B) a binder that is (1) an alkali metal alginate, or (2) a solvent soluble styrene/acrylic copolymer, or (3) a mixture of the copolymer and a water-soluble melamine/formaldehyde prepolymer.

SUMMARY OF THE INVENTION

The present invention provides a method of coating with a composition and the composition itself in which there is an aqueous treating coating composition suitable for coating a middle corrugated layer of a double-faced liner board, the composition comprising (A) an emulsion of wax particles, and (B) a binder that is (1) an alkali metal alginate, or (2) a solvent soluble styrene/acrylic copolymer, or (3) a mixture of the styrene/acrylic copolymer with a water-soluble melamine/formaldehyde prepolymer.

The invention provides an aqueous composition in which there is about 71.5 percent by weight of a wax particles emulsion and about 24 percent by weight of a binder that is preferably sodium alginate.

DETAILS OF THE INVENTION

The wax particles are generally about 0.1 to 150 microns and preferably 1 to 100 microns in diameter. The amount of wax is generally about 40 to 98 percent by weight of the composition and preferably about 50 to 75 percent by weight, the optimum amount for most applications being about 65 to 75 percent by weight.

A suitable wax particle emulsion is Aquabead 325-E™ wax (65 percent total paraffin solids).

Suitable binders are an alkali metal alginate (preferably sodium alginate) a solvent soluble styrene/acrylic copolymer and a mixture of the styrene/acrylic copolymer and a water-soluble melamine/formaldehyde prepolymer.

The binder is generally about 2 to 40 percent by weight, preferably 10 to 35 percent by weight; and more preferably 22 to 32 percent by weight of the composition.

A suitable acrylic/styrene copolymer is P-158™ copolymer.

A suitable melamine/formaldehyde prepolymer is Cymel 303™, there being cross-linking groups to cure the melamine/formaldehyde polymer. A preferred hexamethoxymethylmelamine material cross-linker is CYMEL™ 303 (Cyanamid).

Generally, the viscosity of the composition at 78°–82° F. is about 13.5 to 15.5 sec (#3 Zahn) and the pH is about 8.9 to 9.2.

The water resistance and other properties were measured by standard ASTM or TAPP test methods including a Cobb test. The low Cobb values of 0.1 to 35 obtained are generally under 30 and preferably under 15.

EXAMPLE 1

A formulation providing a waterproof coating was prepared from a composition as follows:

| Ingredient | % by Weight |
|---|---|
| Wax particle emulsion | 71.5 |
| Sodium Alginate | 24 |

The composition formed a coating on a liner board that was waterproof.

EXAMPLE 2

| Ingredient | % by Weight |
|---|---|
| Wax particle emulsion | 68.4 |
| Styrene acrylic prepolymer | 26.5 |
| Melamine/formaldehyde prepolymer | 5.0 |

The composition was applied to a substrate to form a waterproof coating.

What is claimed is:

1. A method of coating a surface of medium corrugated layer of a liner board to provide a water resistant coating, the method comprising the step of applying a thickness of about 0.1 to 10 mils of an aqueous coating composition to the corrugated layer, the composition comprising;

(A) an emulsion of wax particles that is about 40 to 98% by weight of the composition, and (B) a binder that is a solvent soluble styrene/acrylic copolymer.

2. The method of coating a surface of medium corrugated layer of a liner board of claim 1, wherein the binder is about 2% by weight to about 40% by weight of the composition.

3. The method of coating a surface of medium corrugated layer of a liner board of claim 1, wherein the emulsion is about 50% by weight to about 75% by weight of the composition and the binder is about 10% by weight to about 35% by weight of the composition.

4. The method of coating a surface of medium corrugated layer of a liner board of claim 1, wherein the emulsion is about 65% by weight to about 75% by weight of the composition and the binder is about 22% by weight to about 32% by weight of the composition.

* * * * *